United States Patent
Genest

(10) Patent No.: US 10,211,726 B1
(45) Date of Patent: Feb. 19, 2019

(54) CROSS-COUPLED CHARGE-PUMPS

(71) Applicant: SEMICONDUCTOR COMPONENTS INDUSTRIES, LLC, Phoenix, AZ (US)

(72) Inventor: Pierre Genest, Lafitte-Vigordane (FR)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 16/108,949

(22) Filed: Aug. 22, 2018

(51) Int. Cl.
*H02M 3/07* (2006.01)
*H02M 1/00* (2006.01)

(52) U.S. Cl.
CPC ...... *H02M 3/07* (2013.01); *H02M 2001/0041* (2013.01); *H02M 2001/0083* (2013.01)

(58) Field of Classification Search
CPC ........ H02M 3/07; H02M 3/072; H02M 3/073; H02M 2003/077; H02M 2003/075; G11C 5/145; G05F 3/205
See application file for complete search history.

(56) References Cited

U.S. PATENT DOCUMENTS

| | | | |
|---|---|---|---|
| 7,741,898 B2 * | 6/2010 | Hsu | H02M 3/073 327/536 |
| 9,257,903 B2 * | 2/2016 | Huh | H02M 3/073 |

OTHER PUBLICATIONS

Yu, Xiaojian et al.; "A Fully Integrated Multistage Cross-Coupled Voltage Multiplier With No Reversion Power Loss in a Standard CMOS Process," IEEE Transactions on Circuits and Systems—II: Express Briefs, vol. 64, No. 7, Jul. 2017; 1549-7747 Copyright 2016 IEEE; pp. 737-741.
Zhu, Hui et al.; "A 4-phase Cross-coupled Charge Pump with Charge Sharing Clock Scheme," 2011 International Conference on Electronic Devices, Systems and Applications (ICEDSA); Copyright 2011 IEEE; pp. 73-76.
Genest, Pierre, Declaration Regarding Prior Charge Pump, Sep. 26, 2018, 3 pages.

* cited by examiner

*Primary Examiner* — An T Luu
(74) *Attorney, Agent, or Firm* — Dickinson Wright PLLC

(57) ABSTRACT

Cross-coupled charge-pumps. At least some of the example embodiment are methods including: pumping charge from a first capacitor through a first field effect transistor (FET) to a voltage output and from a second capacitor through a second FET to the voltage output of the charge pump; refreshing charge to a third capacitor and a fourth capacitor during the pumping of charge; electrically isolating the first through fourth capacitors during a dead time; and then pumping charge from the third capacitor through a third FET to the voltage output and from the fourth capacitor through a fourth FET to the voltage output of the charge pump; and refreshing charge to the first capacitor and the second capacitor during the pumping of charge from the third and fourth capacitors.

20 Claims, 5 Drawing Sheets

CROSS-COUPLED CHARGE-PUMPS

CROSS-REFERENCE TO RELATED APPLICATIONS

Not Applicable.

BACKGROUND

Power converters convert electrical energy at a first voltage to a second voltage. A charge pump is type of power converter that increases voltage such that the voltage output is higher than the voltage input. One type of charge pump is a cross-coupled charge pump. The related art cross-coupled charge pumps experience unwanted cross-conduction that lowers operating efficiency. In particular, cross-coupled charge pumps use field effect transistors (FET) to selectively pump charge from a charged capacitor to the voltage output, and simultaneously use another FET to refresh the voltage on a second capacitor. The roles of the pump and charge for the two capacitors alternate. However, it takes a finite amount of time for FETs to transition from a conductive state to a non-conductive state, and vice versa. In certain situations partially conductive FETs in cross-coupled charge pumps may allow current to back flow from the voltage output to the voltage input, lowering efficiency.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

In relation to electrical devices, the terms "input" and "output" refer to electrical connections to the electrical devices, and shall not be read as verbs requiring action. For example, a controller may have a gate output and one or more sense inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to improved cross-coupled charge pumps. More particularly, various example embodiments are directed to cross-coupled charge pumps that reduce or eliminate reverse current from the voltage output to the voltage input. The reduced reverse current not only increases operational efficiency, but also enables increased clocking frequency. Increased clocking frequency, in turn, increases the ability to supply current to a load without increasing the size of the various capacitors. More particularly still, example embodiments are directed to a cross-coupled charge pump configured to pump charge through two capacitors and simultaneously refresh two capacitors, and then the roles reverse. The specification first turns to a conceptual overview of a charge pump.

Figure 1:
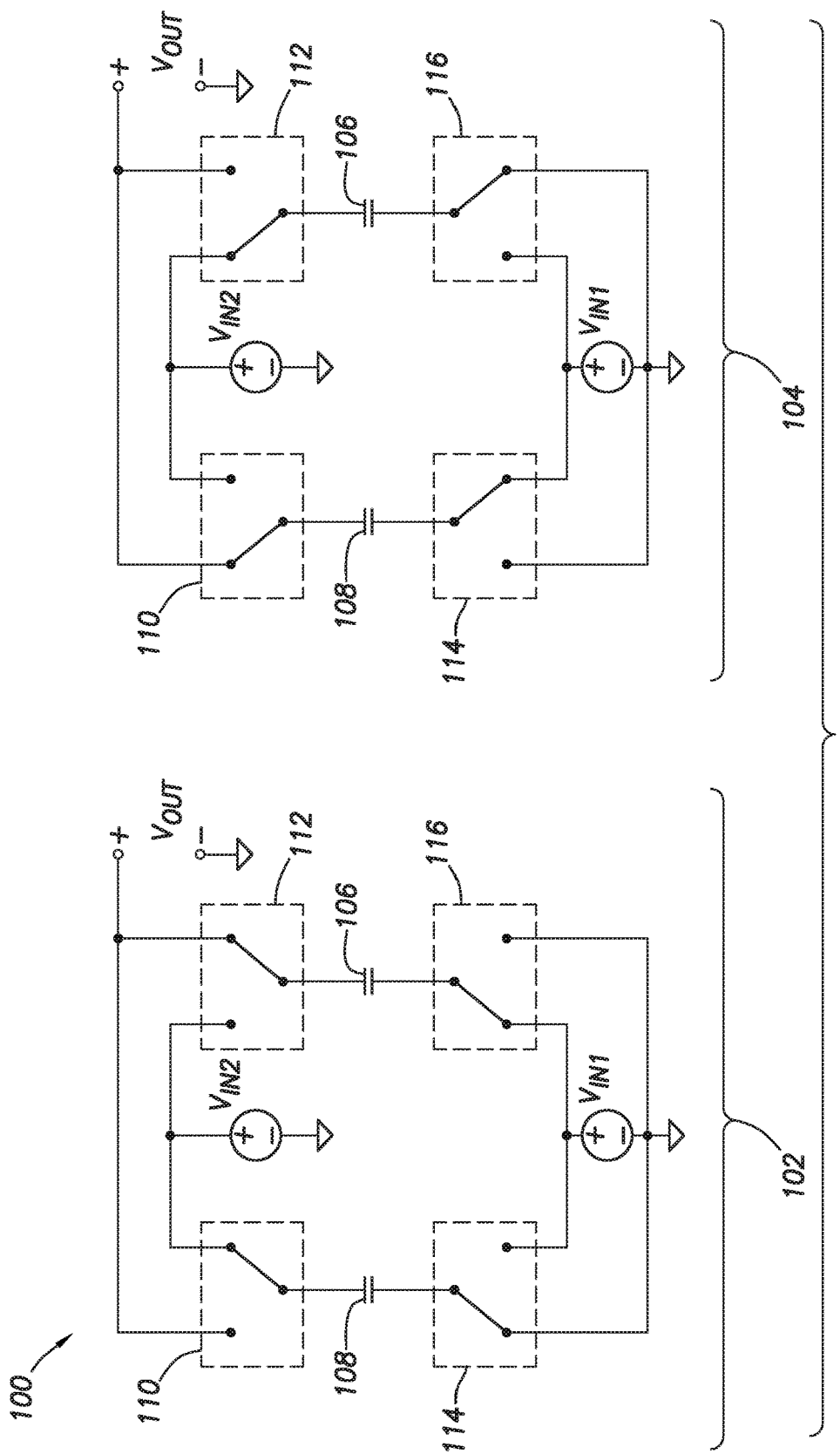
FIG. 1 shows a circuit diagram of a charge pump.

FIG. 1 shows a circuit diagram of a charge pump in two operational states or phases. In particular, the circuit diagram on the left shows the charge pump 100 in the first phase 102, and the circuit diagram on the right shows the charge pump 100 in the second phase 104. During the first phase 102 current to the voltage output $V_{OUT}$ is supplied by capacitor 106 coupled to the voltage input $V_{IN1}$. That is, the voltage output $V_{OUT}$ is the sum of voltage input $V_{IN1}$ and the voltage on the capacitor 106, which we shall see also is initially equal to the voltage input $V_{IN2}$. At the same time the capacitor 106 is pumping current to the voltage output $V_{OUT}$, the example circuit is charging or refreshing capacitor 108 to equal the voltage input $V_{IN2}$.

In the example second phase 104, the roles of the capacitors reverse. That is, during the example second phase 104 current supplied to the voltage output $V_{OUT}$ is pumped by capacitor 108 to the voltage output $V_{OUT}$. Here again, in the second phase 104 the voltage output $V_{OUT}$ is the sum of voltage input $V_{IN1}$ and the voltage on the capacitor 108, where the capacitor 108 was charged to match the voltage input $V_{IN2}$ in the first phase. It follows the voltage output $V_{OUT}$ during the second phase is the sum of the voltage input $V_{IN1}$ and the voltage on the capacitor 108, which we shall see also is initially equal to the voltage input $V_{IN2}$. At the same time the capacitor 108 is pumping current to the voltage output $V_{OUT}$, the example circuit is refreshing capacitor 106 to equal the voltage input $V_{IN2}$. The circuit then reverts to the first phase 102, and the cycle continues supplying voltage and current to the voltage output $V_{OUT}$.

The selective coupling of the capacitors 106 and 108 to either pump current to the voltage output $V_{OUT}$ or be refreshed by the voltage input $V_{IN2}$ is implemented in FIG. 1 as four electrically controlled switches 110, 112, 114, and 116. The electrically controlled switches are shown as single-pole, double-throw switches. The coil signal or control input to each electrically controlled switch is not shown in FIG. 1 so as not to unduly complicate the description. While it may be possible to implement a charge pump with mechanical single-pole, double-throw switches as shown, the operating frequency (e.g., how quickly the circuit could switch between phases) would be severely limited by the time it takes the mechanical switches to change physical positions. In many cases the electrically controlled switches are operated as cross-coupled field effect transistors (FETs).

As alluded to in the Background section, it takes a finite amount of time for FETs to transition from a conductive state to a non-conductive state, and vice versa. In certain situations partially conductive FETs in cross-coupled charge pumps may allow current to back flow from the voltage output $V_{OUT}$ to the voltage input $V_{IN2}$, lowering efficiency. For example, if the FETs that implement the functionality of electrically controlled switch 110 are simultaneously conductive, current will tend to back flow from the voltage output $V_{OUT}$ to the lower voltage input $V_{IN2}$ through the FETs. A similar situation occurs with respect to FETs that implement the functionality of electrically controlled switch 112. Various embodiments are directed to reducing or eliminating reverse current from the voltage output $V_{OUT}$ to the voltage input VIN through the cross-coupled FETs that implement the functionality of the electrically controlled switches 110 and 112. Additional FETs are added along with additional capacitors. The additional capacitors increase the charge pumping capability of the overall circuit.

Figure 2:
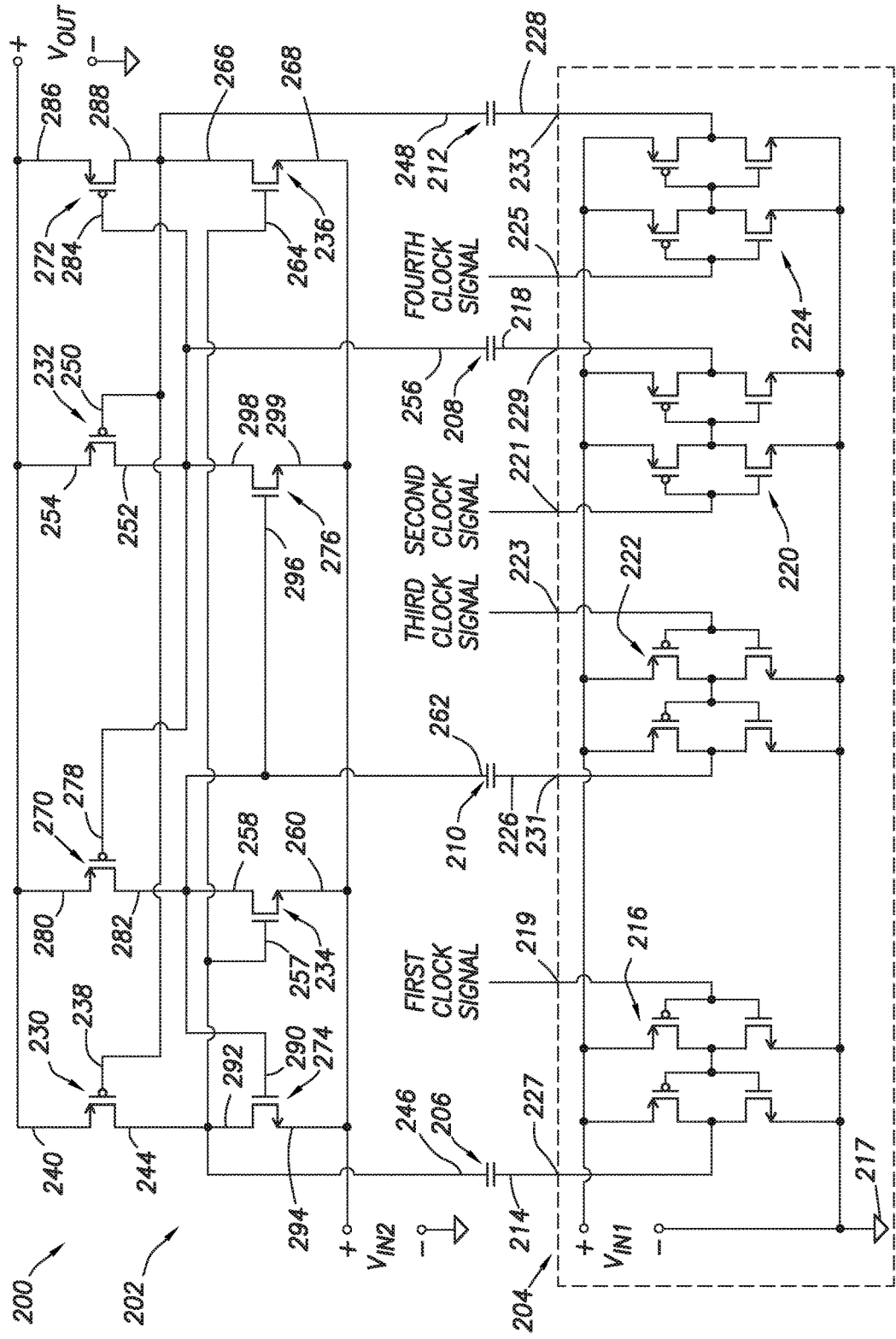
FIG. 2 shows a circuit diagram in accordance with at least some embodiments.

FIG. 2 shows a circuit diagram in accordance with at least some embodiments. In particular, FIG. 2 shows a cross-coupled charge pump 200 (hereafter just charge pump 200) comprising an upper set of FETs 202 (hereafter just upper FETs 202) that implement pumping charge to the voltage output $V_{OUT}$ and refreshing capacitors. The functionality of the upper FETs 202 corresponds to the electrically controlled switches 110 and 112 of FIG. 1, but as discussed more below the functionality of the electrically controlled switches 110 and 112 is implemented across duplicated sets of FETs to reduce or eliminate back flow of current from the voltage output $V_{OUT}$ to the input output $V_{IN2}$. In the example embodiments the upper FETs 202 work with four capacitors. During a first phase, two capacitors pump charge to the voltage output $V_{OUT}$ while two capacitors are refreshed with the voltage of the voltage input $V_{IN2}$. During a second phase, roles are reversed, and two capacitors pump charge to the voltage output $V_{OUT}$ while two capacitors are refreshed with the voltage of the voltage input $V_{IN2}$. Thus, the example charge pump 200 comprises a first capacitor 206, a second capacitor 208, a third capacitor 210, and a fourth capacitor 212. Roles of the capacitors 206, 208, 210, and 212 are dependent, in part, on the state of the switch network 204, so the discussion turns first to the switch network 204.

The switch network 204 implements functionality that corresponds to electrically controlled switches 114 and 116 of FIG. 1, and is merely an example circuit to help understand operation of the upper FETs 202. Implementation of the switch network 204 may take any suitable form. The switch network 204 comprises a plurality of electrically controlled (discussed more below). The switch network 204 defines a first through fourth clock inputs 219, 221, 223, and 225. The switch network 204 defines a first through fourth outputs 227, 229, 231, and 233. The example switch network 204 is configured to drive the voltage input $V_{IN1}$ to the first output 227 and second output 229 when the first and second clock signals are asserted. The switch network 204 is configured to ground the first output 227 and second output 229 when the first and second clock signals are de-asserted. The switch network 204 is configured to drive the voltage input VIN to the third output 231 and fourth output 233 when the third and fourth clock signals are asserted. The switch network 204 is configured to ground the third output 231 and fourth output 233 when the third and fourth clock signals are de-asserted.

More particularly, in the example switch network 204 a first lead 214 of the first capacitor 206 couples to complementary FETs 216 by way of the first output 227. Complementary FETs 216 selectively couple the first lead 214 to the voltage input $V_{IN1}$ or ground 217 depending on the state of the first clock signal applied to gates of the complementary FETs 216. For purposes of this discussion, when the first clock signal is asserted the complementary FETs 216 couple the first lead to the voltage input $V_{IN1}$. Conversely, when the first clock signal is de-asserted, the complementary FETs 216 couple the first lead 214 to ground 217. Stated differently, when the first clock signal is asserted the complementary FETs 216 couple the first lead to the voltage input $V_{IN1}$. Conversely, when the first clock signal is de-asserted, the complementary FETs 216 couple the first lead 214 to ground 217.

Still referring to the switch network 204 of FIG. 1, a first lead 218 of the second capacitor 208 couples to complementary FETs 220 by way of second output 229. Complementary FETs 220 selectively couple the first lead 218 to the voltage input $V_{IN1}$ or ground 217 depending on the state of the second clock signal applied to gates of the complementary FETs 220. For purposes of this discussion, when the second clock signal is asserted the complementary FETs 220 couple the first lead 218 to the voltage input $V_{IN1}$. Conversely, when the second clock signal is de-asserted, the complementary FETs 220 couple the first lead 218 to ground 217. The example switch network 204 likewise contains complementary FETs 222 and 224 coupled to the first lead 226 of the third capacitor 210 and the first lead 228 of the fourth capacitor 212, respectively. The complementary FETs 222 and 224 operate similarly with respect to the third clock signal and the fourth clock signal, respectively, as described with respect to complementary FETs 216 and 220, and so as not to further lengthen the description the operational aspects are not repeated. The description now turns to the upper FETs 202.

The upper FETs 202 in example systems comprise first FET 230, second FET 232, third FET 234, and fourth FET 236. The FETs 230, 232, 234, and 236 are introduced as a group because these FETs are conductive during an example first phase (though their conduction times are not necessarily the same). The FET 230 defines a gate 238, a source 240, and a drain 244. The drain 244 of the first FET 230 is coupled to a second lead 246 of the first capacitor 206. The source 240 of the first FET 230 is coupled to the voltage output $V_{OUT}$. The gate 238 of the first FET 230 is coupled to a second lead 248 of the fourth capacitor 212. The second FET 232 defines a gate 250, a drain 252, and a source 254. The drain 252 of the second FET 232 is coupled to a second lead 256 of the second capacitor 208. The source 254 of the second FET 232 is coupled to the voltage output $V_{OUT}$. The gate 250 of the second FET 232 is coupled to the second lead 248 of the fourth capacitor 212.

Still referring to FIG. 2, the third FET 234 defines a gate 257, a drain 258, and a source 260. The source 260 of the third FET 234 is coupled to the voltage input $V_{IN2}$. The drain 258 of the third FET 234 is coupled to a second lead 262 of the third capacitor 210. The gate 257 of the third FET 234 is coupled to the second lead 246 of the first capacitor 206. The fourth FET 236 defines a gate 264, a drain 266, and a source 268. The source 268 of the fourth FET 236 is coupled to the voltage input $V_{IN2}$, the drain 266 of the fourth FET 236 is coupled to the second lead 248 of the fourth capacitor 212. The gate 264 of the fourth FET 236 is coupled to the second lead 246 of the first capacitor 206.

The upper FETs 202 in example systems further comprise fifth FET 270, sixth FET 272, seventh FET 274, and an eighth FET 276. The FETs 270, 272, 274, and 276 are introduced as a group because these FETs are conductive during an example second phase (though their conduction times are not necessarily the same). The fifth FET 270 defines a gate 278, source 280, and a drain 282. The drain 282 of the fifth FET 270 is coupled to the second lead 262 of the third capacitor 210. The source 280 of the fifth FET is coupled to the voltage output $V_{OUT}$. The gate 278 of the fifth FET 270 is coupled to the second lead 256 of the second capacitor 208. The sixth FET 272 defines a gate 284, a source 286, and a drain 288. The drain 288 of the sixth FET 272 is coupled to the second lead 248 of the fourth capacitor 212. The source 286 of the sixth FET 272 is coupled to the voltage output $V_{OUT}$. The gate 284 of the sixth FET 272 is coupled to the second lead 256 of the second capacitor 208.

Still referring to FIG. 2, the seventh FET 274 defines a gate 290, a drain 292, and a source 294. The source 294 of the seventh FET 274 is coupled to the voltage input $V_{IN2}$. The drain 292 of the seventh FET 274 is coupled to the second lead 246 of the first capacitor 206. The gate 290 of the seventh FET 274 is coupled to the second lead 262 of the third capacitor 210. The eighth FET 276 defines a gate 296, a drain 298, and a source 299. The source 299 of the eighth FET 276 is coupled to the voltage input $V_{IN2}$. The drain 298 of the eighth FET 274 is coupled to the second lead 256 of the second capacitor 208. The gate 296 of the eighth FET 276 is coupled to the second lead 262 of the third capacitor 210.

In the example charge pump 200, the first FET 230, the second FET 232, the fifth FET 270, and the sixth FET 272 are p-channel metal-oxide semiconductor FETs as illustrated in FIG. 2. Thus, each of these example FETs are conductive when the gate voltage is lower than the drain Source voltage, and are non-conductive when the gate is about the same as the drain Source voltage. In the example circuit the third FET 234, fourth FET 236, seventh FET 274, and eighth FET 276 are n-channel metal-oxide semiconductor FETS as illustrated in FIG. 2. Thus, each of these example FETs are conductive when the gate voltage is about the same as the drain higher than the source voltage, and are non-conductive when the gate is lower than the drain voltage is about the same as the source voltage.

The charge pump 200 is designed and constructed to operate in two phases. In a first phase of operation of the charge pump 200, the FETs are configured to pump charge from the first capacitor 206 and second capacitor 208 to the voltage output $V_{OUT}$. Also during the first phase the charge pump 200 is configured to refresh the third capacitor 210 and fourth capacitor 212 from the voltage input $V_{IN2}$. In a second phase of operation of the charge pump 200, the FETs are configured to pump charge from the third capacitor 210 and fourth capacitor 212 to the voltage output $V_{OUT}$. Also during the second phase, the charge pump 200 is configured to refresh the first capacitor 206 and second capacitor 208 from the voltage input $V_{IN2}$. In order to better describe the first phase, the specification turns to simplified circuit diagram of the charge pump.

Figure 3:
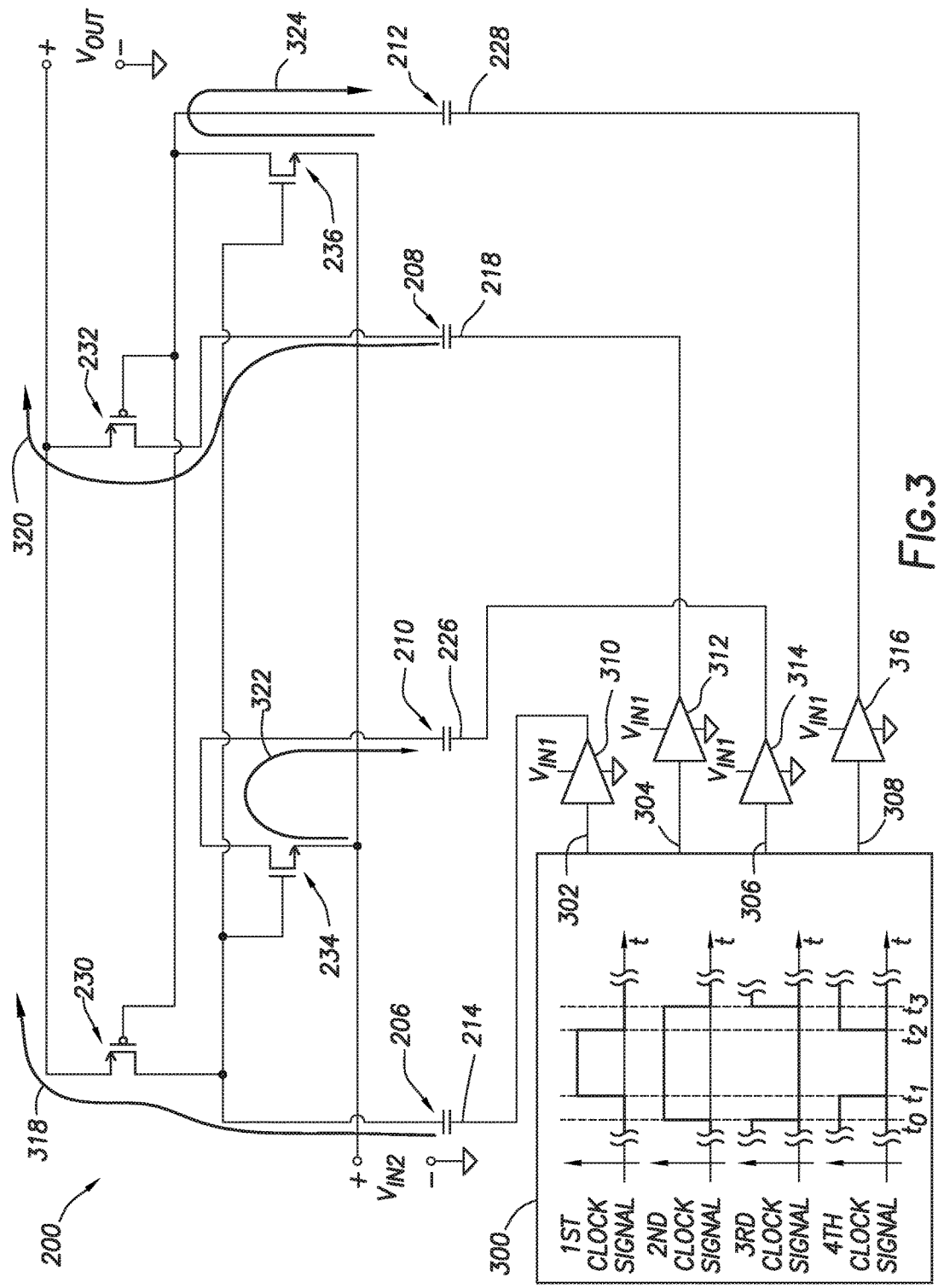
FIG. 3 shows a simplified circuit diagram of a charge pump during a first phase in accordance with at least some embodiments.

FIG. 3 shows a simplified circuit diagram of a charge pump during a first phase in accordance with at least some embodiments. In particular, FIG. 3 shows the example charge pump 200 with only the FETs that are conductive during the first phase shown, and the remaining FETs removed to simplify the drawing. Also shown in FIG. 3 is a clock circuit 300 configured to produce distinct first through fourth clock signals on clock outputs 302, 304, 306, and 308, respectively. Embedded within the clock circuit 300 block are four example clock signals during the first phase (not necessarily to scale). Any suitable system to generate the clock signals may be used. In accordance with example embodiments, each phase is preceded by a transitional period. In the example timing diagram shown, the times t0 to t1 represent a transitional period prior to the first phase. Similarly, times t2 to t3 represent a transitional period after the first phase and prior to the second phase. For purposes of explanation the first through fourth clock outputs are coupled to a first through fourth buffers 310, 312, 314, and 316, respectively. The buffers represent the functionality of the switch network 204 (FIG. 2) for purposes of explanation, but are not necessarily used in actual practice. When the input to a buffer is asserted, the buffer couples VIN to its output, and when the input to a buffer is de-asserted, the buffer grounds its output.

During the first phase between times t1 and t2: the first lead 214 of the first capacitor 206 is driven to $V_{IN1}$; the first lead 218 of the second capacitor 208 is driven to $V_{IN1}$; the first lead 226 of the third capacitor 210 is grounded; and the first lead 228 of the fourth capacitor 212 is grounded. It follows that the gates of the first FET 230 and second FET 232 are low (e.g., approximately at $V_{IN2}$) and thus FETs 230 and 232 are conductive. In the first phase then, charge is pumped from the first capacitor 206 through the first FET 230 to the voltage output $V_{OUT}$ (as shown by arrow 318) and charge is pumped from the second capacitor 208 through the second FET 232 to the voltage output $V_{OUT}$ (as shown by arrow 320). Also during the first phase, the gates of the third FET 234 and fourth FET 236 are high (e.g., approximately at $V_{OUT}$) and thus FETs 234 and 236 are conductive, refreshing charge to the third capacitor 210 (as shown by arrow 322) and a fourth capacitor 212 (as shown by arrow 324).

Still referring to FIG. 3, in the transitional period between times t2 and t3: the first lead 214 of the first capacitor 206 is grounded; the first lead 218 of the second capacitor 208 remains driven to $V_{IN1}$; the first lead 226 of the third capacitor 210 remains grounded; and the first lead 228 of the fourth capacitor 212 is driven to $V_{IN1}$. It follows that the gates of the first FET 230 and second FET 232 are high (e.g., approximately at $V_{OUT}$) and thus FETs 230 and 232 are non-conductive. Also during the transition period between times t2 and t3, the gates of the third FET 234 and fourth FET 236 are low (e.g., approximately at $V_{IN2}$) and thus FETs 234 and 236 are non-conductive. Thus the transitional period between times t2 and t3 is a period of time where the FETs are non-conductive, and for that reason the transitional period is referred to herein as a dead time. Though the description of operation started at time t1, it can be now seen that the state of the various clock signals during the transitional period between times t0 and t1 is the same as the transitional period between t2 and t3, and thus the transitional period between times t0 and t1 also represents a dead time. The example circuit then transitions to a second phase.

Figure 4:
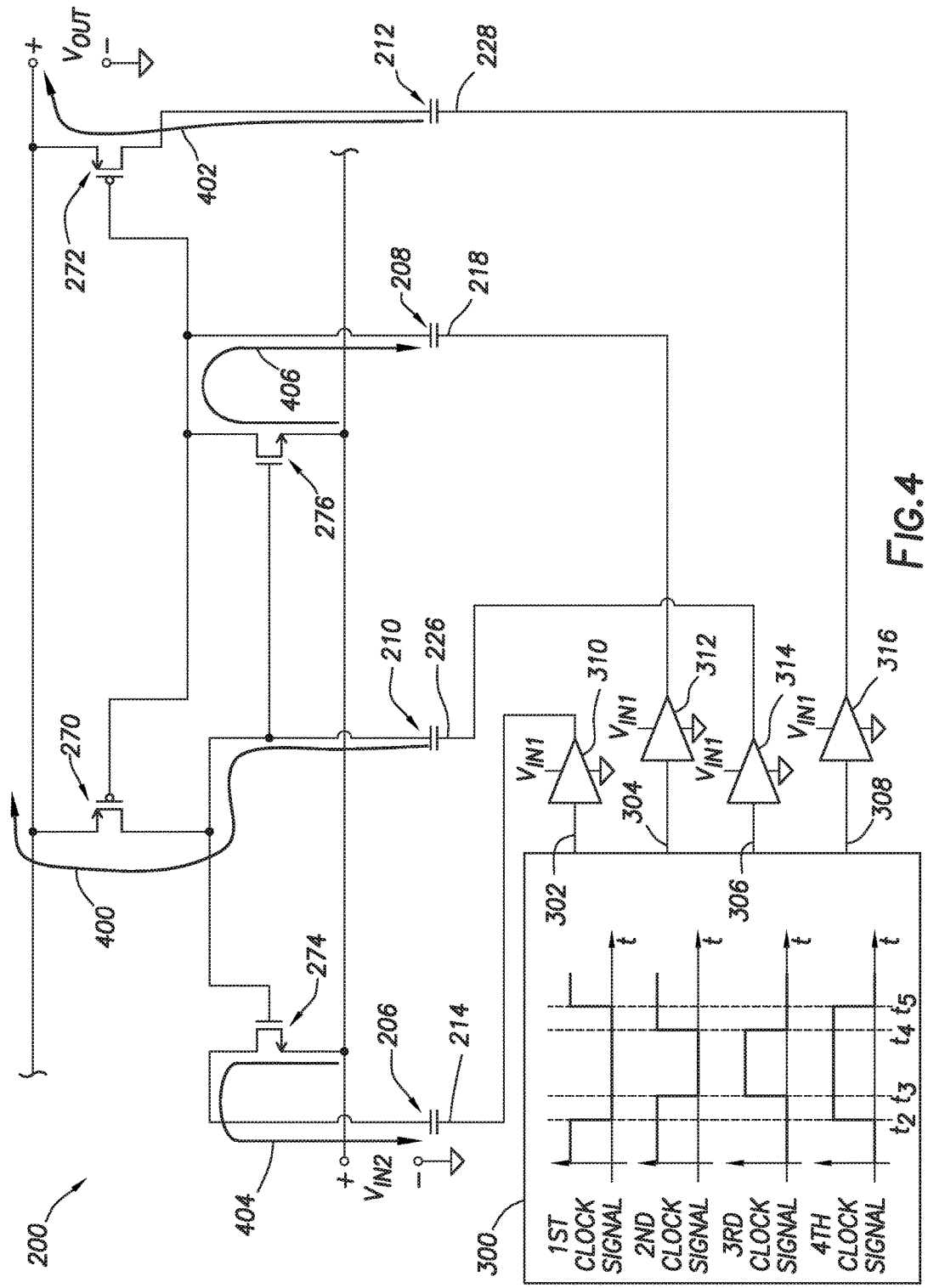
FIG. 4 shows a simplified circuit diagram of a charge pump during a second first phase in accordance with at least some embodiments.

FIG. 4 shows a simplified circuit diagram of a charge pump during a second phase in accordance with at least some embodiments. In particular, FIG. 4 shows the example charge pump 200 with only the FETs that are conductive during the second phase shown, and the remaining FETs removed to simplify the drawing. Also shown in FIG. 4 is the clock circuit 300, in this case including four example clock signals during the second phase (not necessarily to scale). As before, any suitable system to generate the clock signals may be used. As previously mentioned, each phase is preceded by a transitional period. Since the example second phase immediately follows the first phase (from FIG. 3), t2 to t3 represent the transitional period between the first phase and the second phase. As before, consider that the first through fourth clock outputs are coupled to a respect first through fourth buffers 310, 312, 314, and 316, respectively.

During the second phase between times t3 and t4: the first lead 214 of the first capacitor 206 is grounded; the first lead 218 of the second capacitor 208 is grounded; the first lead 226 of the third capacitor 210 is driven to $V_{IN1}$; and the first lead 228 of the fourth capacitor 212 is driven to $V_{IN1}$. It follows that the gates of the fifth FET 270 and sixth FET 272 are low (e.g., approximately at $V_{IN2}$) and thus FETs 270 and 272 are conductive. In the second phase then, charge is pumped from the third capacitor 210 through the fifth FET 270 to the voltage output $V_{OUT}$ (as shown by arrow 400) and charge is pumped from the fourth capacitor 212 through the sixth FET 272 to the voltage output $V_{OUT}$ (as shown by arrow 402). Also during the second phase, the gates of the seventh FET 274 and eighth FET 276 are high (e.g., approximately at $V_{OUT}$) and thus FETs 274 and 276 are conductive, refreshing charge to the first capacitor 206 (as shown by arrow 404) and a third capacitor 208 (as shown by arrow 406).

Still referring to FIG. 4, in the transitional period between times t4 and t5: the first lead 214 of the first capacitor 206 remains grounded; the first lead 218 of the second capacitor 208 is driven to $V_{IN1}$; the first lead 226 of the third capacitor 210 is grounded; and the first lead 228 of the fourth capacitor 212 remains driven to $V_{IN1}$. It follows that the gates of the fifth FET 270 and sixth FET 272 are high (e.g., approximately at $V_{OUT}$) and thus FETs 270 and 272 are non-conductive. Also during the transition period between times t4 and t5, the gates of the seventh FET 274 and eighth FET 276 are low (e.g., approximately at $V_{IN2}$) and thus FETs 234 and 236 are non-conductive. Thus the transitional period between times t4 and t5 is a period of time where the FETs are non-conductive, and for that reason the transitional period is again referred to as a dead time. Though the description of operation started at time t3, it can be now seen that the state of the various clock signals during the transitional period between times t2 and t3 is the same as the transitional period between t4 and t5. The example circuit then transitions back to the first phase.

During a first phase of operation, the charge pump 200 pumps charge from the first capacitor 206 through the first FET 230 to the voltage output $V_{OUT}$ and couples the first lead 214 of the first capacitor 206 to the voltage input $V_{IN1}$ (through the switch network 204). Also during the first phase the charge pump 200 pumps charge from the second capacitor 208 through a second FET 232 to the voltage output $V_{OUT}$ and couples the first lead 218 of the second capacitor 208 to the voltage input $V_{IN1}$ (through the switch network 204). Also during the first phase, the charge pump 200 is designed and constructed to refresh charge to the third capacitor 210 and the fourth capacitor 212. In particular, during the refresh in the first phase the example charge pump 200 couples the voltage input $V_{IN2}$ to a second lead 262 of the third capacitor 210 through a third FET 234, and grounds a first lead of the third capacitor 210 (through the switch network 204), and couples the voltage input $V_{IN2}$ to a second lead 248 of the fourth capacitor 212, and grounds a first lead 228 of the fourth capacitor 212.

Referring again to FIG. 2, the dead times in combination with the duplicated FETs thus reduce or eliminate cross conduction or reverse current from the voltage output $V_{OUT}$ to the voltage input $V_{IN2}$. For example, the dead times ensure that the first FET 230 and seventh FET 274 cannot be conductive at the same time. A similar statement is true for FETs 270 and 234, FETs 232 and 276, and FETs 272 and 236. Moreover, all four capacitors 206, 208, 210 and 212 contribute to the output current (during their respective phases). The reduced reverse current not only increases operational efficiency, but also enables increased clocking frequency. Increased clocking frequency, in turn, increases the ability to supply current to a load without increasing the size of the various capacitors.

Figure 5:
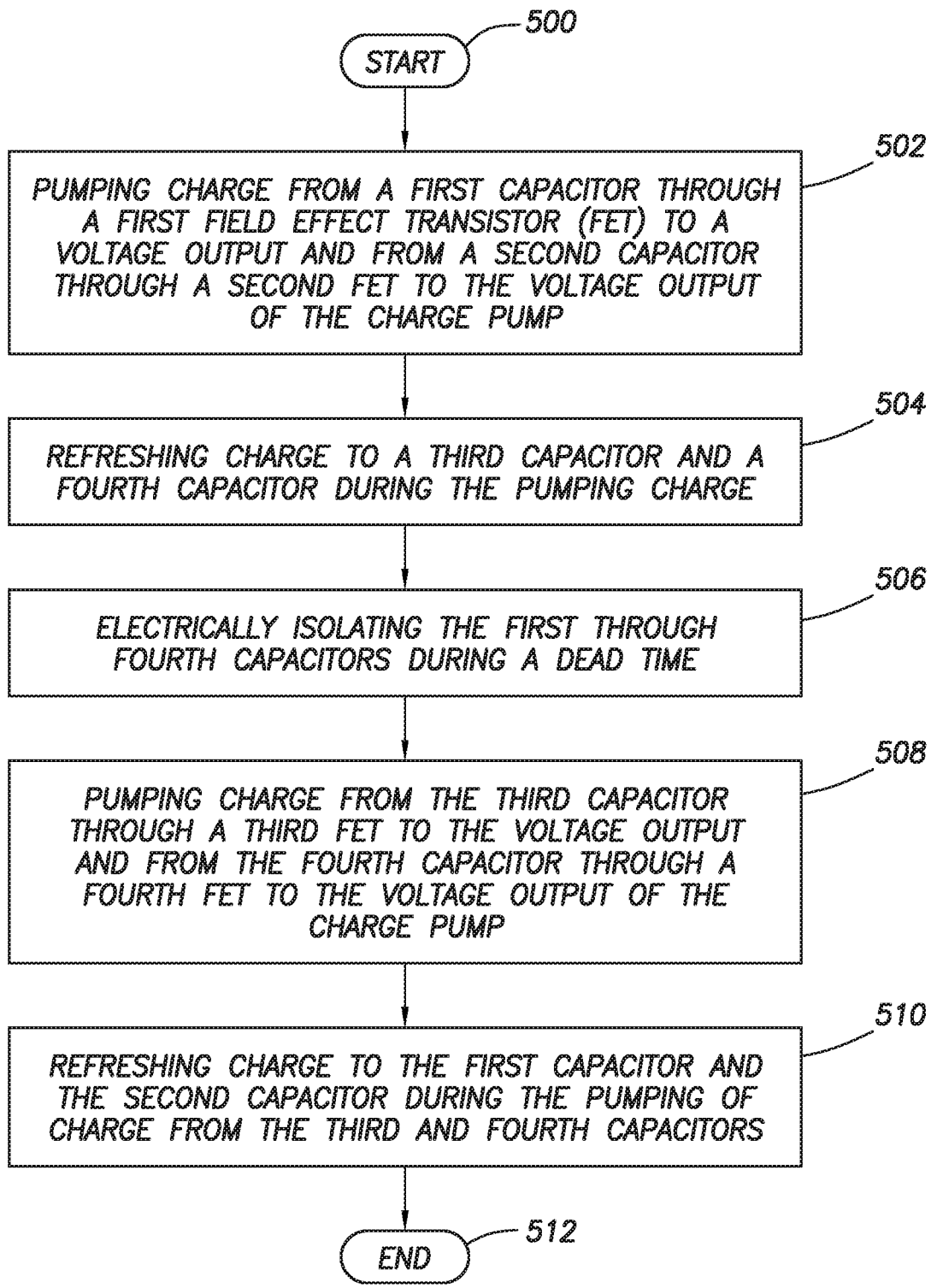
FIG. 5 shows a flow diagram in accordance with at least some embodiments.

FIG. 5 shows a flow diagram in accordance with at least some embodiments. In particular, the method starts (block 500) and comprises: pumping charge from a first capacitor through a first field effect transistor (FET) to a voltage output and from a second capacitor through a second FET to the voltage output of the charge pump (block 502); refreshing charge to a third capacitor and a fourth capacitor during the pumping of charge (block 504); electrically isolating the first through fourth capacitors during a dead time (block 506); and then pumping charge from the third capacitor through a third FET to the voltage output and from the fourth capacitor through a fourth FET to the voltage output of the charge pump (block 508); and refreshing charge to the first capacitor and the second capacitor during the pumping of charge from the third and fourth capacitors (block 510). Thereafter the method end (block 512).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. For example, the switch network 204 could likewise be implemented by a set of eight FETs as shown by the upper FETs 202. It is intended that the following claims be interpreted to embrace all such variations and modifications.

What is claimed is:

1. A method of operating a cross-coupled charge pump, comprising:
   pumping charge from a first capacitor through a first field effect transistor (FET) to a voltage output and from a second capacitor through a second FET to the voltage output of the charge pump;
   refreshing charge to a third capacitor and a fourth capacitor during the pumping of charge;
   electrically isolating the first through fourth capacitors during a dead time; and then
   pumping charge from the third capacitor through a third FET to the voltage output and from the fourth capacitor through a fourth FET to the voltage output of the charge pump; and
   refreshing charge to the first capacitor and the second capacitor during the pumping of charge from the third and fourth capacitors.

2. The method of claim 1 wherein pumping charge from the first and second capacitors further comprises:
   coupling a first voltage input to a first lead of the first capacitor, and coupling a second lead of the first capacitor to the voltage output; and
   coupling the first voltage input to a first lead of the second capacitor, and coupling a second lead of the second capacitor to the voltage output.

3. The method of claim 2:
   wherein coupling the second lead of the first capacitor to the voltage output further comprises driving a gate of the first FET with a second voltage input; and
   wherein coupling the second lead of the second capacitor to the voltage output further comprises driving a gate of the second FET with the second voltage input.

4. The method of claim 1 wherein refreshing charge to the third capacitor and the fourth capacitor during further comprises:
   coupling a voltage input to a second lead of the third capacitor, and grounding a first lead of the third capacitor; and
   coupling the voltage input to a second lead of the fourth capacitor, and grounding a first lead of the fourth capacitor.

5. The method of claim 4:
   wherein coupling the second voltage input to the second lead of the third capacitor further comprises driving a gate of the third FET with the voltage output; and
   wherein coupling the second voltage input to the second lead of the fourth capacitor further comprises driving a gate of the fourth FET with the voltage output.

6. The method of claim 1 wherein pumping charge from the third and fourth capacitors further comprises:
   coupling a first voltage input to a first lead of the third capacitor, and coupling a second lead of the third capacitor to the voltage output; and
   coupling the first voltage input to a first lead of the fourth capacitor, and coupling a second lead of the fourth capacitor to the voltage output.

7. The method of claim 6:
   wherein coupling the second lead of the third capacitor to the voltage output further comprises driving a gate of a fifth FET with a second voltage input; and
   wherein coupling the second lead of the fourth capacitor to the second voltage output further comprises driving a gate of a sixth FET with the voltage input.

8. The method of claim 1 wherein refreshing charge to the first and second capacitors further comprises:
   coupling a second voltage input to a second lead of the first capacitor, and grounding a first lead of the first capacitor; and
   coupling the second voltage input to a second lead of the second capacitor, and grounding a first lead of the second capacitor.

9. The method of claim 8:
   wherein coupling the second voltage input to the second lead of the first capacitor further comprises driving a gate of a seventh FET with the voltage output; and
   wherein coupling the second voltage input to the second lead of the second capacitor further comprises driving a gate of an eighth FET with the voltage output.

10. The method of claim 1 wherein electrically isolating the first through fourth capacitors during a dead time further comprises grounding a first lead of the first capacitor and coupling a first voltage input to a first lead of the fourth capacitor, all while maintaining the first voltage input on the first lead of the second capacitor and maintaining ground on a first lead of the third capacitor.

11. The method of claim 10 further comprising ending the electrically isolating by grounding the first lead of the second capacitor and coupling the first voltage input to the first lead of the third capacitor, all while maintaining ground on the first lead of the first capacitor and maintaining the first voltage input to the first lead of the fourth capacitor.

12. The method of claim 1:
    wherein pumping charge from the first and second capacitors further comprises:
       coupling a first voltage input to a first lead of the first capacitor, and coupling a second lead of the first capacitor to the voltage output; and
       coupling the first voltage input to a first lead of the second capacitor, and coupling a second lead of the second capacitor to the voltage output;
    wherein refreshing charge to the third capacitor and the fourth capacitor during the pumping of charge further comprises:
       coupling a second voltage input to a second lead of the third capacitor, and grounding a first lead of the third capacitor; and
       coupling the second voltage input to a second lead of the fourth capacitor, and grounding a first lead of the fourth capacitor.

13. A cross-coupled charge pump comprising:
    a first capacitor defining a first and second leads, a second capacitor defining a first and second leads, a third capacitor defining a first and second leads, and a fourth capacitor defining a first and second leads;
    a first field effect transistor (FET) defining a gate, a drain, and a source, the drain of the first FET coupled to the second lead of the first capacitor, the source of the first FET coupled to a voltage output, and the gate of the first FET coupled to the second lead of the fourth capacitor;
    a second FET defining a gate, a drain, and a source, the drain of the second FET coupled to the second lead of the second capacitor, the source of the second FET coupled to the voltage output, and the gate of the second FET coupled to the second lead of the fourth capacitor;
    a third FET defining a gate, a drain, and a source, the source of the third FET coupled to a second voltage input, the drain of the third FET coupled to the second lead of the third capacitor, and the gate of the third FET coupled to the second lead of the first capacitor;
    a fourth FET defining a gate, a drain, and a source, the source of the fourth FET coupled to the second voltage input, the drain of the fourth FET coupled to the second lead of the fourth capacitor, and the gate of the fourth FET coupled to the second lead of the first capacitor;
    a fifth FET defining a gate, a drain, and a source, the drain of the fifth FET coupled to the second lead of the third capacitor, the source of the fifth FET coupled to the voltage output, and the gate of the fifth FET coupled to the second lead of the second capacitor;
    a sixth FET defining a gate, a drain, and a source, the drain of the sixth FET coupled to the second lead of the fourth capacitor, the source of the sixth FET coupled to the voltage output, and the gate of the sixth FET coupled to the second lead of the second capacitor;
    wherein, in a first phase of operation of the cross-coupled charge pump, the FETs are configured to pump charge from the first and second capacitors to the voltage output, and configured to refresh the third and fourth capacitors from the voltage input; and
    wherein, in a second phase of operation of the cross-coupled charge pump, the FETs are configured to pump charge from the third and fourth capacitors to the voltage output, and configured to refresh the first and second capacitors from the voltage input.

14. The cross-coupled charge pump of claim 13 further comprising:

a seventh FET defining a gate, a drain, and a source, the source of the seventh FET coupled to the second voltage input, the drain of the seventh FET coupled to the second lead of the first capacitor, and the gate of the seventh FET coupled to the second lead of the third capacitor;

an eighth FET defining a gate, a drain, and a source, the source of the eighth FET coupled to the second voltage input, the drain of the eighth FET coupled to the second lead of the second capacitor, and the gate of the eighth FET coupled to the second lead of the third capacitor.

15. The cross-coupled charge pump of claim 13 wherein the first, second, fifth, and sixth FETS are p-channel metal oxide semiconductor FETs, and the third, fourth, seventh, and eighth FETS are n-channel metal oxide semiconductor FETs.

16. The cross-coupled charge pump of claim 13 further comprising:
    a clock circuit configured to produce distinct first through fourth clock signals;
    a switch network containing a plurality of electrically controlled switches, the switch network defining a first through fourth clock inputs, and a first through fourth voltage outputs;
    the switch network configured to drive a first voltage input to the first and second voltage outputs when the first and second clock signals are asserted;
    the switch network configured to ground the first and second voltage outputs when the first and second clock signals are de-asserted;
    the switch network configured to drive the first voltage input to the third and fourth voltage outputs when the third and fourth clock signals are asserted; and
    the switch network configured to ground the third and fourth voltage outputs when the third and fourth clock signals are de-asserted.

17. The cross-coupled charge pump of claim 16 wherein the clock circuit is further configured to implement a dead time between the first phase and the second phase in which all the FETs are non-conductive.

18. The cross-coupled charge pump of claim 17 wherein when the clock circuit implements the dead time, the clock circuit is further configured to de-assert the first clock signal and assert the fourth clock signal, while holding the second clock signal asserted and holding the third clock signal de-asserted.

19. The cross-coupled charge pump of claim 18 wherein when the clock circuit implements the dead time, the clock circuit is further configured to de-assert the second clock signal and assert the third clock signal, while holding the first clock signal de-asserted and holding the fourth clock signal asserted.

20. A method comprising:
    operating a cross-coupled charge pump by:
    a) supplying current to a load by a first set of capacitors through a first set of field effect transistors (FETs) while simultaneously recharging a second set capacitors through a second set of FETs;
    b) electrically isolating the first and second sets of FETs;
    c) supplying current to a load by the second set of capacitors through a third set of FETs while simultaneously recharging the first set capacitors through a fourth set of FETs; and
    d) repeating steps a) through c).

* * * * *